(12) United States Patent
Saito

(10) Patent No.: US 11,250,221 B2
(45) Date of Patent: Feb. 15, 2022

(54) LEARNING SYSTEM FOR CONTEXTUAL INTERPRETATION OF JAPANESE WORDS

(71) Applicant: SAP SE, Walldorf (DE)

(72) Inventor: Sean Saito, Singapore (SG)

(73) Assignee: SAP SE, Walldorf (DE)

( * ) Notice: Subject to any disclaimer, the term of this patent is extended or adjusted under 35 U.S.C. 154(b) by 265 days.

(21) Appl. No.: 16/352,981

(22) Filed: Mar. 14, 2019

(65) Prior Publication Data

US 2020/0293623 A1    Sep. 17, 2020

(51) Int. Cl.
*G06F 40/30* (2020.01)
*G06F 40/58* (2020.01)
*G06N 3/02* (2006.01)

(52) U.S. Cl.
CPC .............. *G06F 40/58* (2020.01); *G06F 40/30* (2020.01); *G06N 3/02* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| | | | | |
|---|---|---|---|---|
| 6,510,410 B1 * | 1/2003 | Chen | ................ | G10L 15/02 704/207 |
| 6,760,695 B1 * | 7/2004 | Kuno | ................ | G06F 40/30 704/9 |
| 8,315,851 B2 | 11/2012 | Nakano | | |
| 8,706,472 B2 * | 4/2014 | Ramerth | ................ | G06F 40/53 704/2 |
| 8,706,747 B2 * | 4/2014 | Mittal | ................ | G06F 40/12 707/760 |

(Continued)

FOREIGN PATENT DOCUMENTS

CN      106354701 A   *   1/2017
JP      2018128493        8/2018
(Continued)

OTHER PUBLICATIONS

Ratna et al., Ratna, Automatic Essay Grading System for Japanese Language Examination Using Winnowing Algorithm, 2018, iSemantic, pp. 1-5 (Year: 2018).*

(Continued)

*Primary Examiner* — Lamont M Spooner
(74) *Attorney, Agent, or Firm* — Fish & Richardson P.C.

(57) ABSTRACT

Methods, systems, and computer-readable storage media for contextual interpretation of a Japanese word are provided. A first set of characters representing Japanese words is received. The first set of characters are received is input to a neural network. The neural network is trained to processes characters based on bi-directional context interpretation. The first set of characters is processed by the neural network through a plurality of learning layers that process the first set of characters in an order of the first set of characters and in a reverse order to determine semantical meanings of the characters in the first set of characters. An alphabet representation of at least one character of the first set of characters representing a Japanese word is output. The alphabet representation corresponds to a semantical meaning of the at least one character within the first set of characters.

18 Claims, 6 Drawing Sheets

(56) References Cited

U.S. PATENT DOCUMENTS

| | | | |
|---|---|---|---|
| 9,275,019 | B2 | 3/2016 | Weinberg et al. |
| 9,734,197 | B2* | 8/2017 | Mittal .................. G06F 16/972 |
| 10,083,155 | B2 | 9/2018 | Kochura et al. |
| 2004/0261021 | A1* | 12/2004 | Mittal .................. G06F 3/0237 |
| | | | 715/256 |
| 2006/0241933 | A1* | 10/2006 | Franz .................. G06F 40/274 |
| | | | 704/2 |
| 2014/0188454 | A1* | 7/2014 | Mittal .................... G06F 40/12 |
| | | | 704/2 |
| 2017/0154258 | A1* | 6/2017 | Liu ....................... G06N 3/0445 |
| 2017/0351673 | A1* | 12/2017 | Mittal .................... G06F 40/12 |
| 2018/0336179 | A1* | 11/2018 | Toda ..................... G06F 40/268 |
| 2018/0349346 | A1* | 12/2018 | Hatori ..................... G06F 40/53 |
| 2019/0138606 | A1* | 5/2019 | Tu ............................ G06F 40/49 |
| 2019/0311227 | A1* | 10/2019 | Kriegman .......... G06K 9/00442 |
| 2020/0065384 | A1* | 2/2020 | Costello ............... G06N 3/0454 |
| 2020/0143191 | A1* | 5/2020 | Du ........................ G06K 9/6272 |
| 2020/0250379 | A1* | 8/2020 | Wang ..................... G06N 3/049 |
| 2020/0311196 | A1* | 10/2020 | Xu ........................... G06F 40/30 |
| 2020/0320116 | A1* | 10/2020 | Wu ......................... G06F 16/739 |
| 2020/0335096 | A1* | 10/2020 | Li ............................ G10L 15/16 |

FOREIGN PATENT DOCUMENTS

| | | |
|---|---|---|
| KR | 101086550 | 11/2011 |
| WO | 2017160746 | 9/2017 |

OTHER PUBLICATIONS

Jones et al., Jones, Experiments in Japanese Text Retrieval and Routing using the NEAT system, 1998, Proceedings of the 21st annual international ACM SIGIR conference on Research and development in information retrieval, pp. 197--205 (Year: 1998).*
Yamashita et al., A Comparison of Entity Matching Methods between English and Japanese Katakana, 2018, Proceedins of the 15th Sigmorphon Workshop on Computational Research in Phonetics, Phonology, and Morhpology, pp. 84-92. (Year: 2018).*
U.S. Appl. No. 16/186,784, filed Nov. 12, 2018, Saito et al.
U.S. Appl. No. 16/208,681, filed Dec. 4, 2018, Saito et al.
U.S. Appl. No. 16/210,070, filed Dec. 5, 2018, Le et al.
U.S. Appl. No. 16/217,148, filed Dec. 12, 2018, Saito et al.

* cited by examiner

LEARNING SYSTEM FOR CONTEXTUAL INTERPRETATION OF JAPANESE WORDS

BACKGROUND

Computer implemented natural language interpretation is a complex task when no manual intervention is provided. Japanese is a language where words can be represented with different character sets. In Japanese, there are three types of character sets—hiragana, katakana and kanji, which may also be used in a mixed way. For example, katakana is used mostly for foreign words. Further, in Japanese, some document types are associated with a certain character set(s). For example, invoices usually contain a mix of hiragana, katakana, and kanji, whereas bank statements may contain only katakana (e.g., single-byte katakana).

The same word in Japanese can be represented differently by different character sets. Therefore, one word may have multiple representations with Japanese characters. Based on a given content of use of the word, one of these different representations may be a preferred representation. Direct character comparison of two words represented as sequences of Japanese characters may not lead to a determination whether they have the same meaning. By comparing two sequences of characters forming one or more words, it may be determined that they are different. However, these two different sequences may be different representations of a common meaning word/phrase.

SUMMARY

Implementations of the present disclosure are directed to computer-implemented methods for contextual interpretation of a Japanese word. More particularly, implementations of the present disclosure are directed to processing of a set of characters representing Japanese words using a neural network to determine alphabet representations corresponding to semantical meaning of the first set of characters. A set of characters representing Japanese words are processed based on a plurality of learning layers that processes the set of characters in the order they are received and in a reverse order to determine semantical meanings of the characters within the set of characters.

In some implementations, actions include receiving a first set of characters representing Japanese words, inputting the first set of characters to a neural network trained to processes characters based on bi-directional context interpretation, processing the first set of characters by the neural network through a plurality of learning layers that process the first set of characters in an order of the first set of characters and in a reverse order to determine semantical meanings of the characters in the first set of characters, and outputting an alphabet representation of at least one character of the first set of characters representing a Japanese word, wherein the alphabet representation corresponds to a semantical meaning of the at least one character within the first set of characters.

These and other implementations can each optionally include one or more of the following features: the first set of characters is provided in a word writing order; a character of the first set of characters is interpreted within the neural network based on context provided by a subsequent character within the order of the first set and a previous character of the character within the order of the first set.

These and other implementations can each optionally include that processing the received first set of characters at the neural network comprises: processing, at a first learning layer of the plurality of layers, the first set of characters in the order to determine a first set of character interpretations; processing, at a second learning layer of the plurality of layers, the first set of characters in the reverse order to determine a second set of character interpretations; concatenating a first interpretation of the first set of character interpretations and a first interpretation of the second set of character interpretations, both corresponding to same character of the received first set; inputting a set of concatenated interpretations from the first set of character interpretations and the second set of character interpretations to a third learning layer of the neural network to determine semantical meanings of characters of the set based on the bi-directional context interpretation associated with the order and the reverse order of the first set; and determining semantical meanings of the characters of the set based on evaluation of the set of concatenated interpretations.

Further, these and other implementations can also optionally include that a first interpretation of the at least one character within the first set of character interpretations is associated with a first Japanese syllabary, and a second interpretation of the at least one character within the second set of character interpretations is associated with a second Japanese syllabary, wherein the first and second interpretations have a different meaning.

Further, these and other implementations can also optionally include determining the first interpretation of the at least one character to be the semantical meaning of the character during processing the received first set of characters at the neural network based on the bi-directional context interpretation; and outputting a Latin alphabet representation of the first interpretation of the at least one character.

These and other implementations can also optionally include determining a Japanese syllabary from a plurality of Japanese syllabaries to be associated with the first set of characters based on the determined bi-directional context interpretation of the first set within the neural network.

These and other implementation can also optionally include that the at least one character of the first set is in a first Japanese syllabary and is equivalent to one or more different characters from a different Japanese syllabary when an alphabet representation of the character and the different character are the same, and optionally include receiving a second set of characters representing Japanese words, inputting the second set of characters into the neural network to be processed based on the plurality of learning layers to determine bi-directional context interpretation of the characters of the second set, outputting a second set of alphabet representations corresponding to the second set of characters, wherein the second set is determined to be associated with a second Japanese syllabary different from the first Japanese syllabary, comparing a first set of alphabet representations and the second set of alphabet representations, wherein the first set of alphabet representations are output for the first set of characters based on processing by the neural network, and based on the comparing, determining that one or more characters of the first set has the same meaning as one or more different characters from the second set based on the first character being equivalent to the different character.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
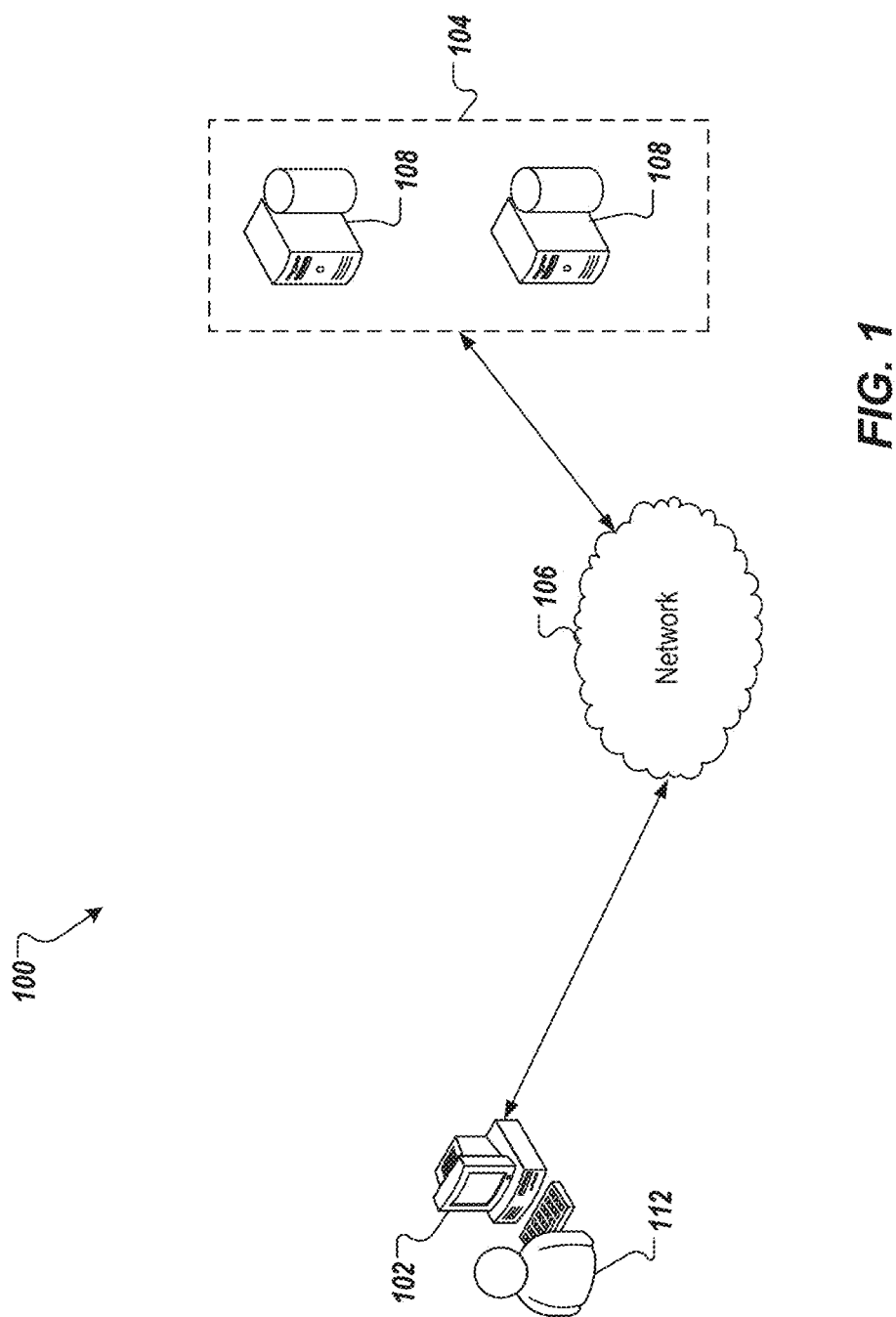
FIG. 1 depicts an example architecture that can be used to execute implementations of the present disclosure.

Implementations of the present disclosure are directed to contextual interpretation of Japanese words. More particularly, implementations of the present disclosure are directed to processing of a set of characters representing Japanese words using a neural network to determine alphabet representations corresponding to semantical meaning of the first set of characters. A set of characters representing Japanese words are processed based on a plurality of learning layers that process the set of characters in the order they are received and in a reverse order to determine semantical meanings of the characters within the set of characters. Implementations can include actions of receiving a first set of characters representing Japanese words, inputting the first set of characters to a neural network trained to processes characters based on bi-directional context interpretation, processing the first set of characters by the neural network through a plurality of learning layers that process the first set of characters in an order of the first set of characters and in a reverse order to determine semantical meanings of the characters in the first set of characters, and outputting an alphabet representation of at least one character of the first set of characters representing a Japanese word, wherein the alphabet representation corresponds to a semantical meaning of the at least one character within the first set of characters.

To provide further context for implementations of the present disclosure, and as introduced above, machine-transformation of words received in a sequence can be challenging. For example, one or more other words in the sequence may provide context for a word that is to be interpreted, and the word can be interpreted differently depending on the context. A technical solution for determining a semantic meaning of a word within a received set of words in Japanese language may be even more challenging. This is due at least in part to the language complexity and different character sets that can be used for representing words in Japanese.

Japanese language includes three distinct character sets: hiragana, katakana, and kanji. A given word in Japanese may have different representations with different character sets or mixture thereof. One word having a certain meaning may be presented with the different character sets to form different character representations. As a single word in Japanese may be represented differently, a preferred representation of the word may be dependent on the context of use of the word. For example, words are used in documents that may be associated to a particular field of use, e.g., accounting, marketing, banking, literature, science, etc.

Usually, words are provided in a context that provides meaning when interpreting words. Meaning of one word may be reflected based on meaning of other word provided in close proximity to that word, e.g., previous or next word, a phrase of words, etc. For example, if the word is part of a written document, words are provided in a given order that provides semantical meaning to the words. In another example, if words are provided as part of a user interface of a software application, order of words in their visual representation and positioning of the words on a display area to be presented provides context for interpretation of a word from the words. In some of these examples, the presentation of words is according to a word writing order, e.g. from left to right, and/or from top to bottom of a written area where text comprising the words is presented.

In some cases, a representation of a word in a particular data set may be mapped to multiple representations in a different character set. Therefore, processing of characters forming words in Japanese may be a complex task for natural language processing (NLP) implemented by a computer system. This is because it is not evident from the written form which character set is used for representing the Japanese words. Further, direct comparison of words based on character representations is not able to provide a result leading to a conclusion whether these words have the same or different meaning.

Evaluation of text coming from different sources and representing words in Japanese, without explicit indication of the character set that is being used for word representation and/or a context indication is a technically cumbersome task for a data evaluation and word transformation. In some cases, if text coming from different data sources is compared by a language processing machine, matching of characters and words that are defined with different character sets is impractical and cumbersome. Evaluation of such different data sources may require multiple user interactions until a successful result when words are evaluated in a separate isolated manner from the rest of the provided characters/words. Therefore, implementation of transformation in an automated manner in a computer system without user interaction, e.g. an interpreter, or a user to support the context interpretations, may be associated with a lot of data processing and evaluation steps. Automation of transformation and comparison of words is challenging and imply improved understanding of meaning of words within context, which may be facilitated by a learning neural network according to implementations of current disclosure. To address these issues for automation of transformation of Japanese words, a computer implemented method for contextual interpretation is provided according to implementations of the present disclosure.

In view of the above context, implementations of the present disclosure provide a computer implemented method for contextual processing of a received set of Japanese characters representing a Japanese word. In some implementations, and as described in further detail herein, characters are processed by a neural network based on a plurality of learning layers, where the characters are processed in the received order and in a reverse order to determine their semantical meaning.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an application (e.g., provided as one or more computer-executable programs executed by one or more computing devices) that executes NLP of Japanese text. For example, a first set of characters may be provided to the server system 104. The firsts set of characters may represent Japanese words with Japanese characters, e.g. of a given character set such as kanji representation. The server system 104 may input the set of characters to a neural network trained to process characters based on bi-directional context interpretation, as described in further detail herein.

As introduced above, implementations of the present disclosure are directed to context interpretation of Japanese words. A Japanese word represented with Japanese characters may have different representations corresponding to different meanings when interpreted in a given context. For example, in the field of accounting, a use case may be when a bank statement as a first data source is provided, and an invoice is provided as a different data source for matching. The bank statement and the invoice each include text including Japanese characters. However, from the written representation of each of the documents, it is not evident which Japanese character set is used in each of the data sources, because different character sets share common characters. Therefore, determining which character set is associated with a data source may be performed based on context analysis of the data sources as a continuous sequence of characters provide context for other characters in the sequence. In such manner, transforming and matching of data sources including Japanese characters may be provided as a computerized method for contextual interpretation according to implementations of the current disclosure.

In some instances, it may be requested that text from a bank statement is compared with text from an invoice. However, these two documents are of different source type, e.g. field of use, therefore, it is possible that they are defining both in Japanese, but with different character sets. Both of these data sources may include Japanese words and provide information associated with common data fields, e.g. a customer name, a supplier name, an object, characteristics of the object, such as color, type, model, etc., a type of payment, etc. However, if data entries corresponding to a data field in the bank statement and a corresponding data field in the invoice are transformed into alphabet representations in an isolated manner from the context provided by the corresponding data source, the data entries may be evaluated and matched to correspond to different meanings. Therefore, if transformation is performed in isolation, different interpretations are determined and therefore it may be concluded that data entries for a corresponding data field are different, whereas they are the same. In such manner, if a bank statement from a customer is compared and matched to an invoice that is also associated with that customer, it is possible that a customer's name is presented with different Japanese characters in these documents. This different name representation may be, for example, due to the fact that, in Japanese, invoices usually contain a mix of hiragana, katakana, and kanji, as characters sets that may be used in invoices, and bank statements only contain katakana. Therefore, a customer name field in both data sources, the invoice and the bank statement, may have a corresponding data entry to one and the same name, but represented with different characters as presented with different character sets in Japanese.

In accordance with implementations of the current disclosure, a solution for processing and analyzing Japanese documents as an automated processes without human intervention is provided. When documents in Japanese are transformed into an alphabet representation, a word from a document may have multiple meanings, as this is very common feature of natural languages. However, within a given phrase, context, use case, etc., it is understandable for a human, being able to practice the language, which is the meaning of the word. According to implementations of the present disclosure, understanding of a human being of meaning of words within document's context may be implemented within a computer implemented process. Based on such a computer-implemented process, characters may be processed by a neural network based on multiple leaning layers to provide contextual interpretations of words. Such automated processing, transformation and matching of documents may be implemented through advanced deep learning algorithms to learn to convert Japanese text represented with different character sets (hiragana, katakana, kanji) into an alphabet representation. For example, the alphabet representation may be a Latin alphabet representation such as an English phonetic representations (i.e., romaji).

When a Japanese word in a given character set representation is provided and converted into another alphabet representation, such alphabet representation may be used and compared with another alphabet representation of another Japanese word to determine whether these words are the same. Therefore, when Japanese words are converted into alphabet representations through advanced learning algorithms determining contextual interpretations within the context of the data sources, such alphabet representations may be directly compared.

When automated transformation according to implementations of the present disclosure are incorporated as part of a software system that evaluated different data input coming from different data sources, the outcome of comparison and evaluation of data can be greatly improved, as well as the overall performance of the software system. In such manner, direct comparison of output representations may yield a result, while providing improved quality and performance of the computer system implementing the learning algorithms.

Figure 2:
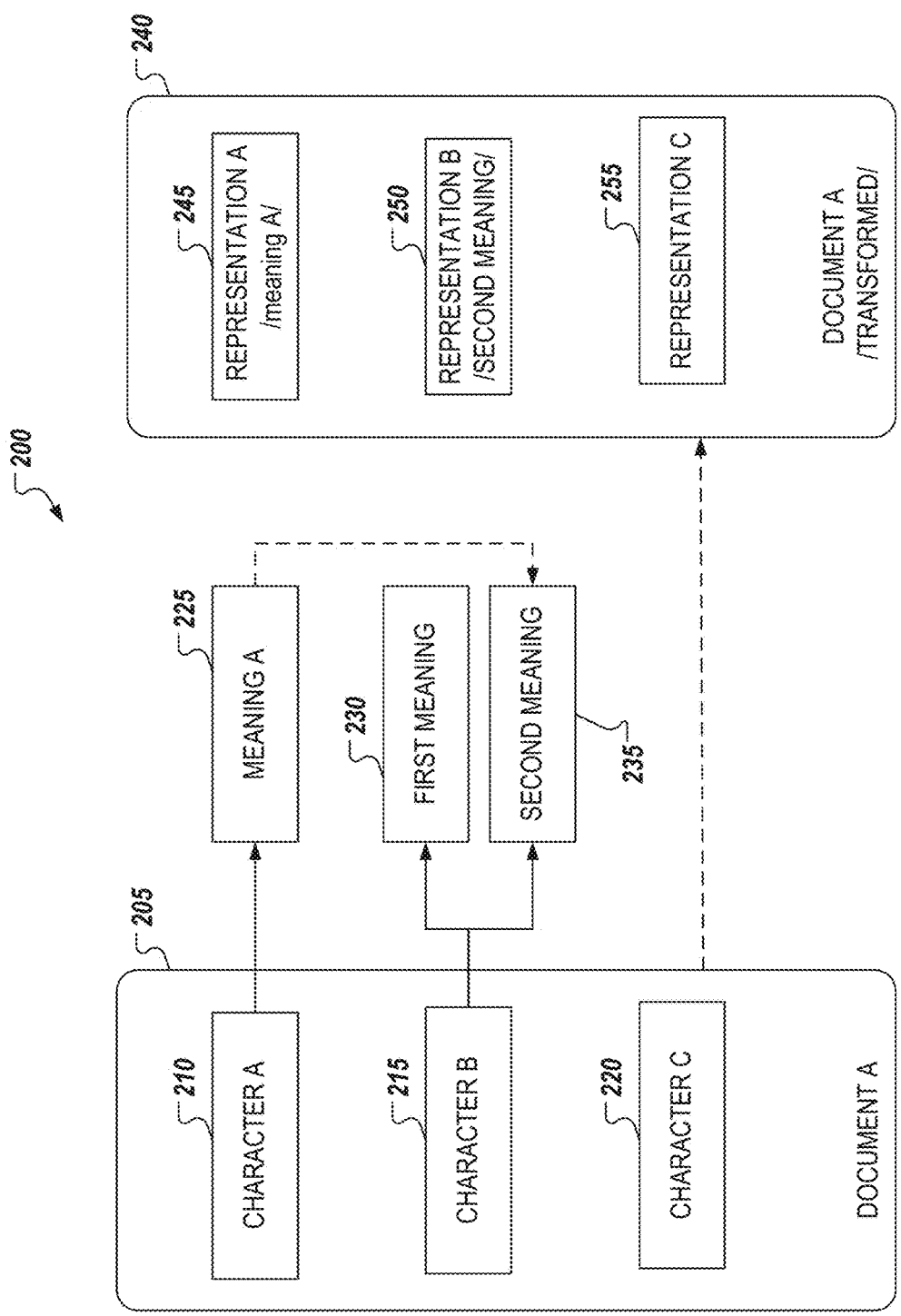
FIG. 2 depicts an example transformation process based on contextual semantic meaning in accordance with implementations of the present disclosure.

FIG. 2 depicts an example transformation process 200 based on contextual semantic meaning in accordance with implementations of the present disclosure. The process 200 may be implemented in a server system, such as the server system 104 of FIG. 1. The process 200 may be implemented as a computer-implemented process executed by one or more processors.

In accordance with implementations of the present disclosure, a document A 205 is provided as input to a software system for contextual interpretation. The document A 205 includes Japanese words that are presented with Japanese characters. One or more Japanese characters may form a single Japanese word. As discussed above, Japanese has specifics in word representation, where a word in Japanese may be represented by one or more character sets, or a combination therefore. The document A 205 includes character A 210, character B 215, and character C 220. For the sake of the example, the characters 210, 215, and 220 represent different Japanese words in a given character set representation. When evaluated one by one, characters may be interpreted to correspond to different meanings compared to when evaluated as a sequence providing context to one another. For example, character A 210 may be associated with a single meaning—meaning A 225, whereas character B 215 may be associated with two different meanings—first meaning 230 and second meaning 235. Different meanings associated with a given character may be due to the field of use of the word. For example, the first meaning 230 of character B may be a commonly used family name in Japan, and the second meaning 235 may correspond to a company name. Which one of the two meanings is the relevant meaning for document A 205 may be associated with what exactly is provided before that word. If a character is evaluated to determine transformation and interpretation without taking into consideration adjacent words or characters, a selection of one of the meanings as the meaning that correspond to the data source document, i.e. document A, may be arbitrary.

According to implementations of the present disclosure, a meaning for a character within a document, such as character B 215, is selected based on context that is provided by other words and/or characters that are before and/or after the character. For example, meaning A 225 of character A 210 may provide that the better suited meaning within the context of document A 205 would be the second meaning 235. For example the meaning of character A may be "company". Therefore, when determining which meaning of character B 215 should be selected as a corresponding meaning to the word to be transformed, the second meaning 235 may be selected as that meaning is a common company's name.

Document A 205 may include further characters, and a character from the set of characters of document A 205 may be interpreted according to learning layers implemented in a neural network according to implementations of the present disclosure. In some examples, a character of the set of characters in document A 205 may be interpreted based on context provided by a subsequent character and/or a previous character of that character within the order of the characters in document A 205. For example, the order of the characters may be a representation order of words within the document A 205, or may be a word writing order, such as from left to right, top to bottom, etc.

When document A 205 is transformed into document A in form 240, characters A 210, B 215, and C 220 are transformed to corresponding representations (245, 250, and 255) that correspond to the meaning of the characters A, B, and C within the context of document A 205. Based on the meaning A 225 of character A 210, which is before character B 215, the second meaning 235 of character B 215 is determined to be the appropriate meaning of character B 215. Therefore, representation B 250 of character B 215 corresponds to the second meaning 235. Representation A 245 corresponds to character A 210 and to the meaning A 225.

For example, in the field of accounting, one usually matches bank statements from a customer to the invoices that were sent to that customer on the basis of the customer name expressed in both documents. Such bank statement and invoices have data fields, in which the name of the customer is identified. However, in Japan, invoices usually contain a mix of hiragana, katakana, and kanji, whereas bank statements only contain katakana (i.e., single-byte katakana). When a bank statement and an invoice are processed, and they contain Japanese words defined based on different character sets, then it is possible that words within these documents have different representations even though they may have same meaning. Therefore, evaluation and matching of documents, written in Japanese is not practical to be done by direct comparison of the Japanese words as provided. In Table 1, example Japanese words corresponding to the customer name in two different instances of data source—one bank statement and one invoice, are presented.

TABLE 1

| Bank Statement | | | Invoice | |
| --- | --- | --- | --- | --- |
| ... | Customer | ... | ... Customer | ... |
| | ミツビシ | | | 三菱 |

In Table 1, on the left side, there is an extraction of a bank statement, where a data field "Customer" is defined, and a data entry for the customer's name is provided in Japanese characters—ミツビシ. On the right side, there is an invoice with the same data field "Customer" and another customer's name data entry. On the left side, the customer's name is presented in katakana, and on the right side, the customer's name is presented in kanji. The characters in the respective sets corresponding to the customer's name in katakana and kanji have different UTF-8 byte codes, and hence it is impossible to compare the words using an equality ('==') operator. In some implementations, it may be possible to convert Japanese words from one character set into another and thus to perform comparison. In Japanese, this procedure of transforming from one character set into another is called henkan. Utilizing such a procedure, in the context of typing or providing words with alphabet letter as input, a corresponding string of Japanese characters of a particular set is provided. For example, if function f is defined as a function that performs henkan, an example henkan transformation of the word 'mitsubishi' may have a form as presented in equation function (1):

$$f(\text{'mitsubishi'}) = \{三菱, ミツビシ, みつびし \ldots\} \quad (1)$$

The input of function f( ) may be a romaji input which is defined as English phonetic representations of a Japanese word. As the example function (1) shows, f( ) is a surjective function that maps the input to multiple possible transformations. When a representation of the provided input is to be determined, a selection from the list of options should be made. Usually, such selection of an appropriate transformation from a list of suggestions is performed manually, as an appropriate transformation is selected not in isolation, but within a context of words provided for transformation.

In accordance with implementations of the current disclosure, a software system automates transformation of Japanese words within a provided word context and compares and evaluates documents of different type and origin to support data processing. For example, such a software system may support a process of matching bank statements with invoices without the aid of an accountant to evaluate a correspondence between names of customers', companies', and/or other written properties and data entries. Such a system has improved performance and automation without manual effort or dependencies.

In the context of example of Table 1, and from equation (1) it may be determined that it is possible that both customer's names are the same, as both of these sets of characters on the left and on the right may be a transformation of the word 'mitsubishi'. However, determining whether this is the appropriate interpretation in both cases may depend on the context of using the Japanese characters.

In accordance with implementations of the current disclosure, a reverse transformation function is implemented that applies a reverse transformation (or a reverse henkan) on Japanese word presented with Japanese characters in one or more character sets. The reverse transformation function may be implemented to convert one or more Japanese characters back to an alphabetic interpretation, such as a romaji representation. In some embodiment, the reverse transformation may be performed based on advanced deep learning algorithms, which learn to apply such a transformation rather than rely on a set of heuristics and rules strictly fixed in a system implementing transformation and matching.

Figure 3:
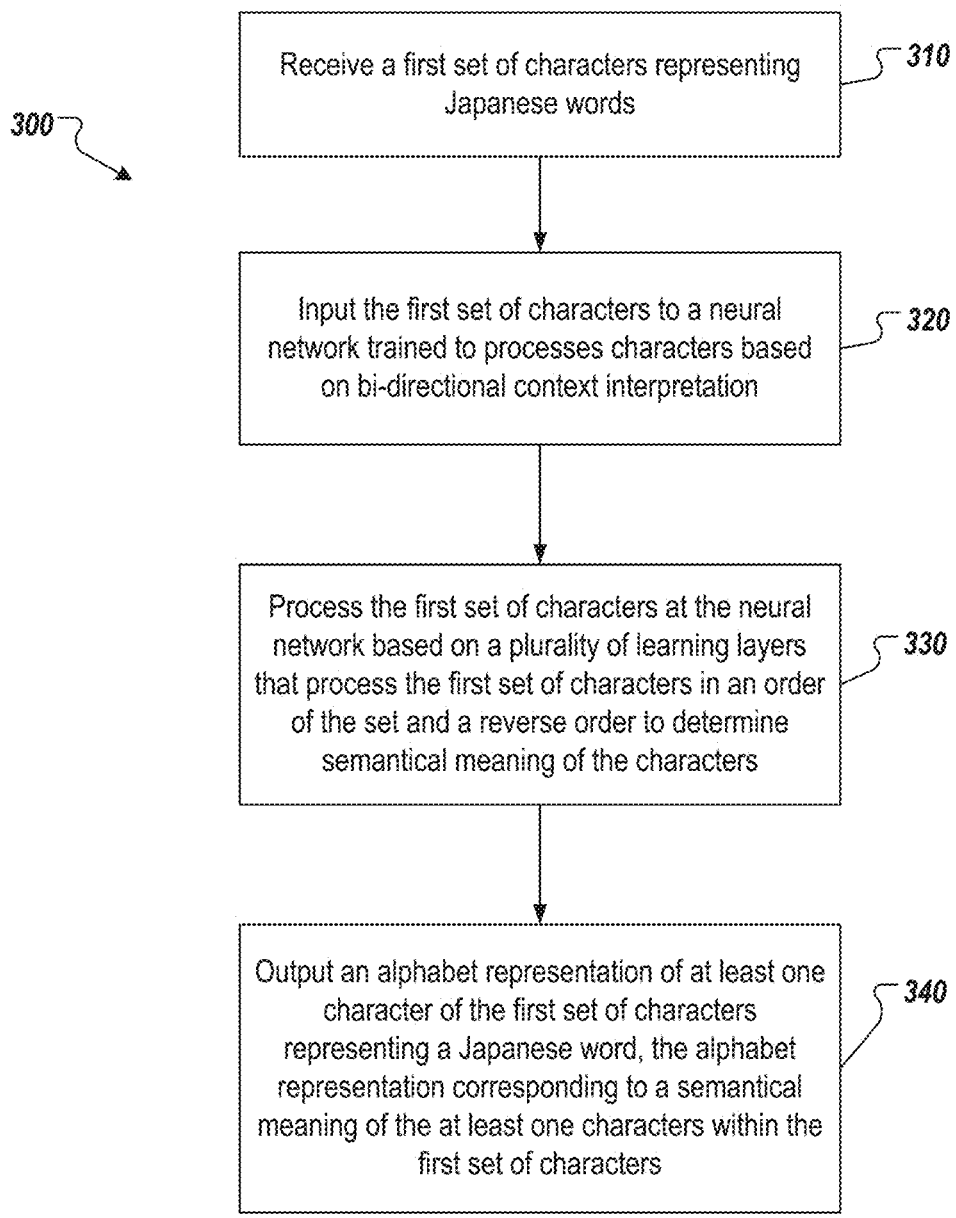
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

At 310, a first set of characters representing Japanese words is received. In some examples, the first set of characters may be provided in a word writing order within a document. In other examples, it may be provided in a screen presenting order of a user interface, such as a graphical user interface, where information and data is provided to an end user. The first set of characters may be such as a customer name as presented in Table 1 above—三菱 and ミツビシ.

At 320, the first set of characters is input to a neural network trained to processes characters based on bi-directional context interpretation. The received characters are evaluated in relation to previously presented words or subsequent words to define context of use of the character. It may be possible that when interpreting a first character from the set, that character is mapped to more than one interpretations. Determining a relevant interpretation is dependent on the context of use of the set of characters. The different interpretations for a character may be associated with a different character set used for the interpretation. If the first set of characters is associated with a first Japanese syllabary and with a second Japanese syllabary, it may be determined that the first Japanese syllabary is the relevant one for the first set of characters based on determining a bi-direction context interpretation of the characters within the neural network.

In some examples, when a character of the first set of characters is in a first Japanese syllabary, such as kanji, that character may be equivalent to one or more different characters defined with a different Japanese syllabary. The equivalency between the characters is a semantic equivalency of interpretation of word. In particular examples, these may be interpreted as synonym meaning of words, or they may be interpreted as exactly corresponding words.

At 330, the first set of characters is processed by the neural network based on a plurality of learning layers that process the first set of characters in the order of the first set of characters and in a reverse order to determine semantical meanings of the characters in the first set of characters.

At 340, an alphabet representation of at least one character of the first set of characters representing a Japanese word is output. The alphabet representation corresponds to a semantical meaning of the at least one characters within the first set of characters. In some implementations of the present disclosure, the output alphabet representation may be a Latin alphabet representation, such as a romaji interpretation. Further, in some implementations, a set of alphabet representations are output that correspond to the received first set of characters of Japanese words.

Figure 4:
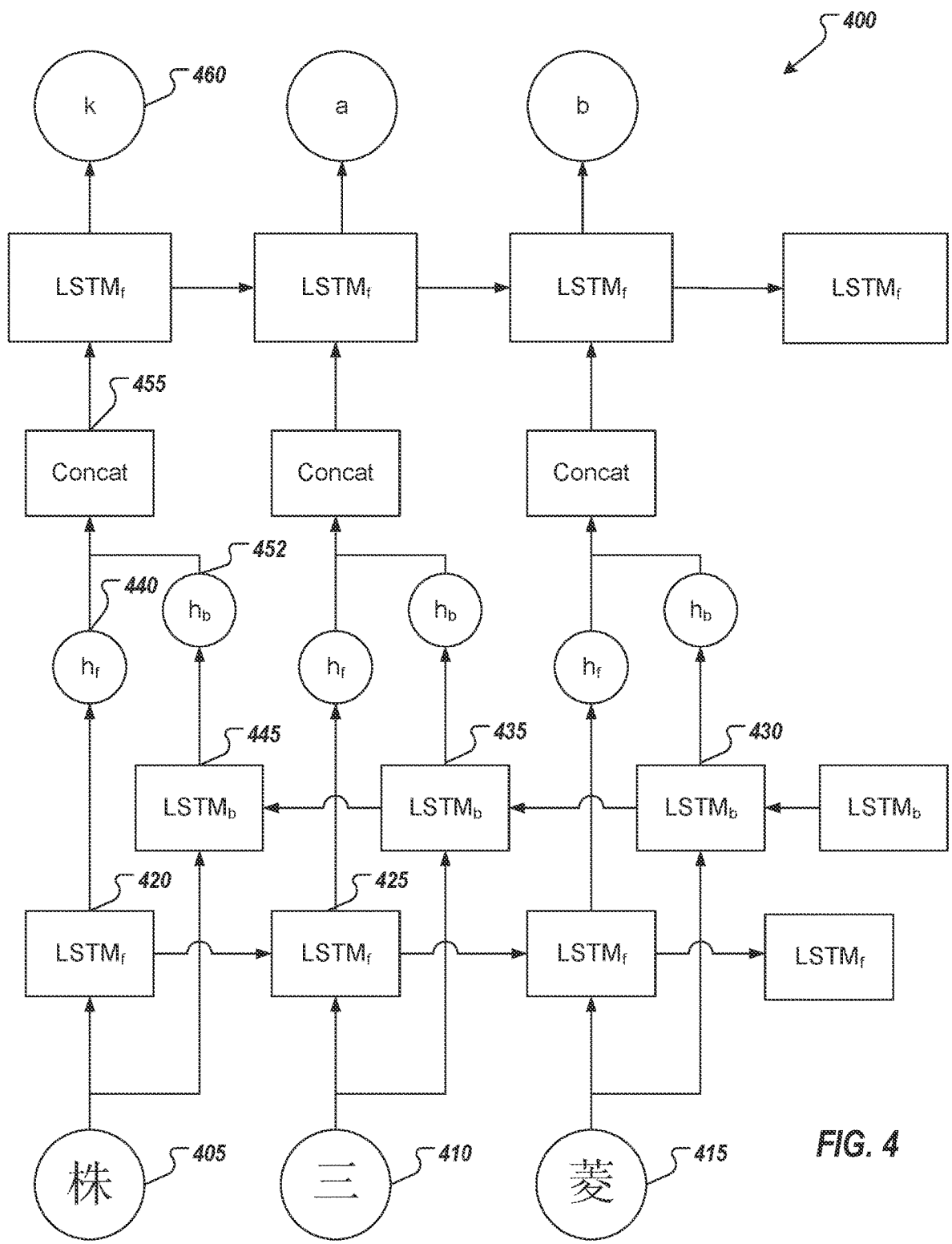
FIG. 4 depicts an example conceptual architecture of a multi-layer neural network that process characters in order of writing and in reverse to determine semantic meaning within context of received characters according to implementations of the present disclosure.

FIG. 4 depicts an example conceptual architecture 400 of a multi-layer neural network. In some implementations, the multi-layer neural network process characters in order of writing and in reverse to determine semantic meaning within context of received characters according to implementations of the present disclosure.

A set of character 405, 410, and 415 are received for transformation using a neural network. The neural network may be a bi-directional context neural network for contextual interpretation of Japanese words represented in different character sets, such as hiragana, katakana, kanji, or combination thereof. The bi-directional context neural network may be such as the one discussed above in relation to FIGS. 1, 2, and 3. The bi-directional context neural network may be implemented to include multiple learning layers for processing the input characters.

The characters 405, 410 and 415 are processed at a first layer of the bi-directional neural network in the order as received, for example from left to right, starting with 405.

The characters 405, 410 and 415 are processed in a reverse order starting with 415 at a second layer of the bi-directional neural network, from right to left.

When characters are provided for transformation, usually they are provided in the order of writing, or order of structuring and presenting information in written form. It may be appreciated, that the order of organizing written text is associated with providing meaning and context to the words comprised in the text. Words are ordered in phrases and may form sentences, passages, paragraphs, documents, that convey meaningful elaboration of ideas and organization of some logic and construction.

For a given character to be interpreted, context provided by other characters at a close proximity may be relevant. Therefore, the implemented neural network processes characters in both directions, so that a character is evaluated with regard to context provided by the characters that are subsequent and/or preceding. If a character is a first one to be received from the set, it is evaluated based on the context provided by the subsequent character only. In some examples, it may be processed that a first character received from a set is a first character or word from a sentence.

The characters 405, 410, and 415 are processed as a sequence-2-sequence task and a bi-directional Long Short-Term Memory (bi-LSTM) model is implemented to predict the romaji form of input characters. The bi-LSTM model is a sequence-2-sequence deep learning model that may be used for learning use cases associated with sequential learning, where understanding of the meaning of words and text is provided through context of use. Long-Short Term Memory (LSTM) models are specialized neural networks that are trained to learn sequences of inputs.

In accordance with implementations of the present disclosure, the conceptual architecture 400 is based on a bi-LSTM model including multiple layers of LSTM cells, where the layers learn the sequences in opposite directions. The first layer of LSTM cells includes cells 420, 425, etc., and that layer is implemented to learn from left to right. The second layer of the LSTM includes cells 430, 435, etc., where the layer is implemented to learn from right to left (opposite direction).

A character set representation can be mapped to multiple representations in another set. This also applies to the henkan and reverse henkan transformation. For example, the word represented with two Japanese characters—川重, can be read as either kawashige, which is a common surname, or kawajyuu, which is the name of a heavy industries company. The correct transformation usually depends on the context in which the word is present. In accordance with implementations of the present disclosure, using the bi-LSTM network allows to capture and learn the context of words so that interpretation can be automated without input on context understanding from a manual human interaction. For example, based on the implementations of the neural network, e.g. as described in FIG. 4, if the words around 川重 refer to a corporation or entity, then the model is more likely to transform it to kawajyuu, which is a heavy industry company name. Similarly, if the context (e.g., other characters/words in close proximity to these characters) around the word refers to an individual person, then the transformation would output "kawashige".

Therefore, input characters 405, 410, 415 at the bi-directional neural network are processed at two layers in sequences to determine their interpretations. For example, when character 405 is provided to the first layer LSTM$_f$ 420, a first interpretation of character 405 is determined, namely, interpretation h$_f$ 440 of the first set of interpretations. When character 405 is provided to the second layer LSTM$_b$ 445, a first interpretation of character 405 is determined, namely, interpretation h$_b$ 452 of the second set of interpretations.

As characters 405, 410, and 415 are processed in sequences but in different order at the different layers of the neural network, then at the first layer, character 405 is the first to be processed, whereas at the second layer, character 415 is the first to be processed.

In some implementations, a first interpretation of a character, e.g. h$_f$ 440, within the first set of character interpretations, e.g. 440 and 452, may be associated with a first Japanese syllabary. A second interpretation of the character, e.g. h$_b$ 452, within the second set of character interpretations, may be associated with a second Japanese syllabary. In some instances, the first and second interpretations have a different meaning.

At a third layer, the first interpretation from the first layer of character 405, namely interpretation 440, is concatenated with interpretation 452. The concatenated interpretation 455 are provided to an LSTM$_f$ processing node, to determine an interpretation of the character 405 that has the semantic meaning of the character 405 within the provided context from the other characters 410 and 415. Based on the determined semantic meaning, an alphabet representation of the determined interpretations may be output at 460. The alphabet representation may be a Latin alphabet representation.

In accordance with implementations of the current disclosure, if characters 川 重 are provided as character 410 and 415, based on the bi-directional neural network multi-layer processing at 400, it may be determined whether character 405 has the meaning of a company or a person, and based on that context characters 410 and 415 may be interpreted.

In the example where the characters 410 and 415 are provided as part of an invoice, they are interpreted to 'Mitsubishi' based on applying the reverse henkan algorithm. If the bank statement as presented at Table 1 is also input to the bi-directional context neural network of 400, the characters ミツビシ are also interpreted as "Mitsubishi" based on the reverse henkan as presented here in accordance with implementations of the present disclosure.

Therefore, if the bank statement and invoice of Table 1 are input into a server system, where a bi-directional neural network as described herein is implemented, they may be compared to determine whether they refer to the same customer (i.e. Mitsubishi') based on the context interpretation functionality provided.

Figure 5:
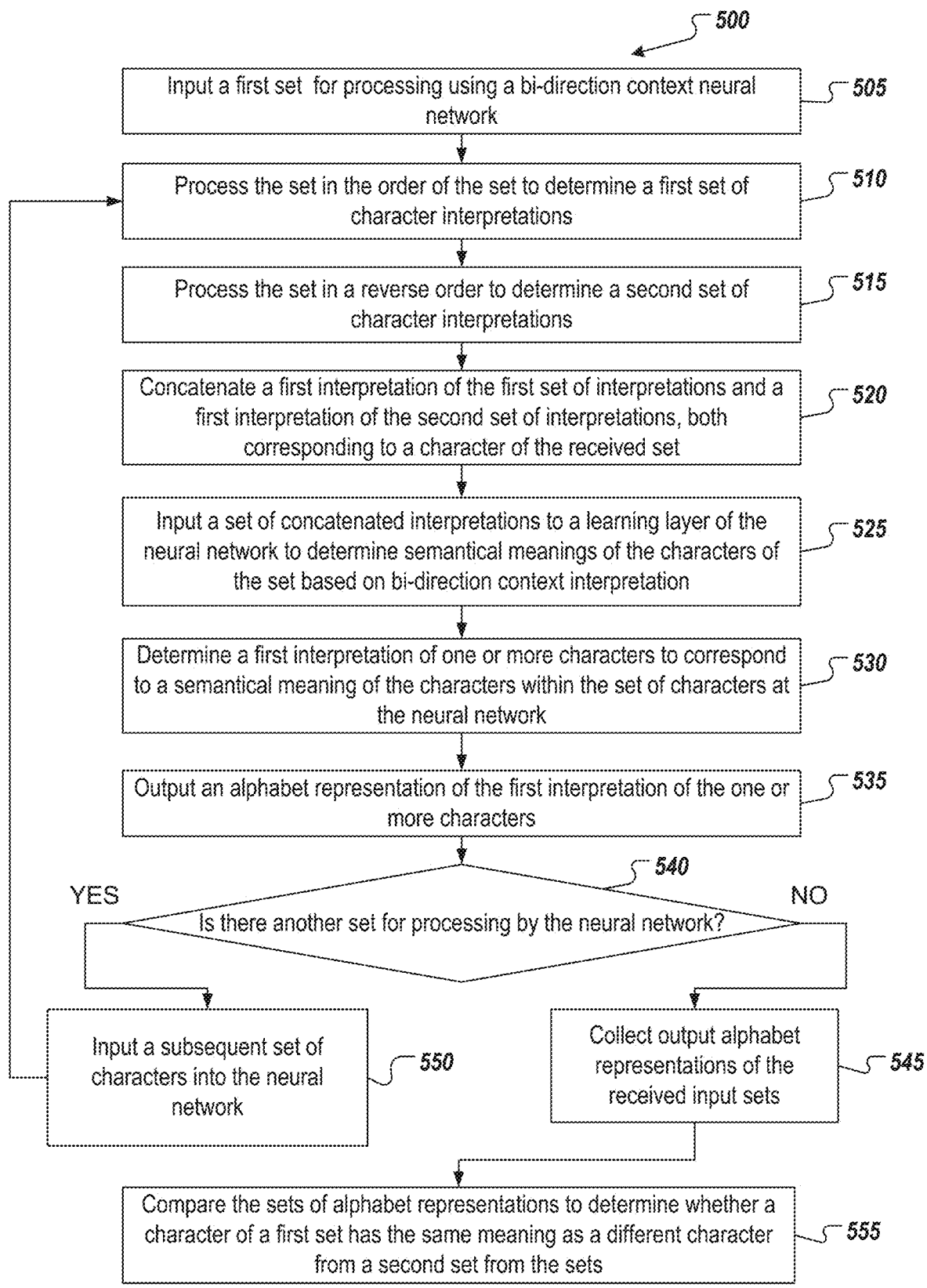
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

At 505, a first set of characters is received for processing. The first set is received by a bi-directional context neural network. The bi-directional context neural network may be such as the one discussed above in relation to FIGS. 1, 2, 3, and 4. Further, the bi-directional context neural network may have a conceptual architecture of implementation including multiple learning layers for processing the input characters as discussed in relation to FIG. 4. For example, the input first set of characters may be such as character 405, 410, and 415 at FIG. 4.

At 510, the first set of characters is processed in the order of the set as received. Based on the processing, a first set of character interpretations are determined correspondingly to the input firsts set. Processing the first set of characters in the order of the set may be performed at a first learning layer of the plurality of layer at the bi-directional context neural network, as discussed in relation to FIG. 4.

At 515, the set of characters is processed in a reverse order to determine a second set of character interpretations. The processing in received order may be performed at a second learning layer of the plurality of layers of the neural network.

In such manner, a character from the set as input is processed to determine two corresponding character interpretations, one from the first processing layer and one from the second processing layer. In some examples, the two character interpretations of the character may be equal in their written representation.

At 520, a first interpretation of the first set of character interpretations and a first interpretation of the second set of character interpretations, both corresponding to a character of the received first set are concatenated. In same manner, all of the characters from the first set of characters may be processed to determine a corresponding set of concatenated representations including interpretations from the first set of character interpretations and from the second set of character interpretations. The concatenation of the interpretations as provided by the two layers of processing the input characters in bi-directional order may be such as the discussed concatenation and processing at FIG. 4

At 525, the set of concatenated interpretations from the first set of character interpretations and the second set of character interpretations are input to a third learning layer of the neural network. The set of concatenated interpretations are input to determine semantical meanings of characters of the set based on the bi-directional context interpretation associated with the order and the reverse order of the first set. The semantical meanings of the characters of the set may be determined based on evaluation of the set of concatenated interpretations.

At 530, a first interpretation of one or more characters is determined to correspond to a semantical meaning of the character within the set of character at the neural network.

At 535, an alphabet representation of the first interpretation of the at least one character is output. The alphabet representation may be Latin alphabet representation.

At 540, it is evaluated whether there is another set of characters that is to be processed by the neural network. For example, the first set of characters may be such as characters provided from a bank statement as described above in relation to FIGS. 1 and 2, and Table 1. And a second set of characters may be such as characters from an invoice, as described above in Table 1.

When there are no other sets of characters to be processed by the neural network, at 545, output alphabet representations of the received set of characters is provided. That output may include just one set, such as the first set, or may include other sets that are also provided for processing at step 510.

When there are more sets of characters to be processed, at 550, a subsequent set of characters is input to the neural network and the process 500 iterated again at 510 through 540.

At 555, the sets of alphabet representations are compared. The comparison is performed when there are at least two sets of characters that are input at the neural network. The comparison is performed to determine whether a character of the first set has the same meaning as a different character from a second set from the sets.

By converting Japanese text into their respective alphabet representations, e.g. English phonetic strings, text strings maybe easily compared and determined if equal or equivalent. This may greatly improve the performance of automated software systems that process and evaluate Japanese documents. In particular, applying advanced deep learning algorithms to learn to convert Japanese text (hiragana, katakana, kanji) into their English phonetic representations (romaji) may facilitate direct comparison of text and documents in Japanese.

Figure 6:
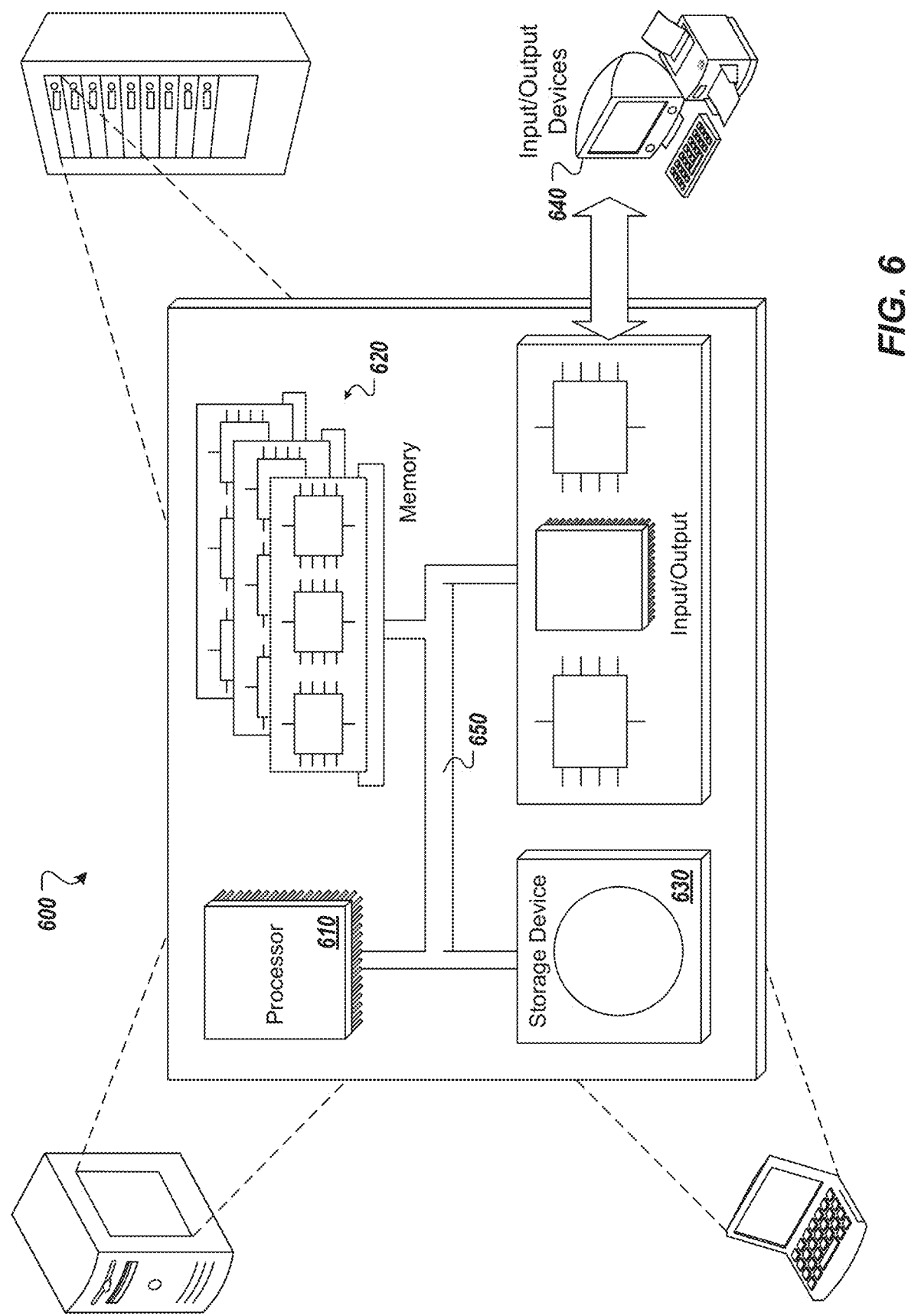
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer implemented method for contextual interpretation of a Japanese word, the method being executed by one or more processors and comprising:
   receiving a first set of Japanese characters representing Japanese words within a first document, the first set of Japanese characters being provided only in katakana;
   inputting the first set of Japanese characters to a neural network trained to process Japanese characters based on bi-directional context interpretation;
   processing the first set of Japanese characters by the neural network through a plurality of learning layers that process the first set of Japanese characters, the neural network comprising a first layer comprising a first set of first long-short term memory (LSTM) cells to process the first set of Japanese characters in an order, each first LSTM cell receiving a Japanese character as input and providing a first interpretation of the respective Japanese character based on the order, and a second layer comprising a second set of second LSTM cells to process the first set of Japanese characters in a reverse order, each second LSTM cell receiving a Japanese character as input and providing a second interpretation of the respective Japanese character based on the reverse order;
   outputting, from a third set of third LSTM cells, a first representation of at least one character of the first set of Japanese characters, the first representation comprising a set of Latin-based letters representing a Japanese word, each third LSTM cell receiving a concatenation of a respective first interpretation and a respective second interpretation as input and providing a Latin-based letter based on the order, wherein the first representation corresponds to a meaning of the at least one Japanese character within the first set of characters; and
   selectively matching the first document to a second document at least partially based on the first representation, the second document comprising a second set of Japanese characters provided in a mix of katakana, hiragana, and kanji, the first document being selectively matched to the second document.

2. The method of claim 1, wherein the first set of Japanese characters is provided in a word writing order.

3. The method of claim 1, wherein a Japanese character of the first set of Japanese characters is interpreted within the neural network based on context provided by a subsequent Japanese character within the order of the first set and a previous Japanese character of the Japanese character within the order of the first set.

4. The method of claim 1, wherein the order is an order of the first set of Japanese characters.

5. The method of claim 1, wherein the first interpretation is associated with a first Japanese syllabary, and the second interpretation is associated with a second Japanese syllabary, wherein the first and second interpretations have a different meaning.

6. The method of claim 5, further comprising:
   determining the first interpretation of the respective Japanese character during processing the received first set of Japanese characters at the neural network based on the bi-directional context interpretation; and
   outputting a Latin alphabet representation of the first interpretation of the at least one character.

7. The method of claim 1, further comprising:
   determining a Japanese syllabary from a plurality of Japanese syllabaries to be associated with the first set of Japanese characters based on the bi-directional context interpretation of the first set within the neural network.

8. The method of claim 1, further comprising:
   receiving a second set of Japanese characters representing Japanese words in the second document;
   inputting the second set of Japanese characters into the neural network to be processed based on the plurality of learning layers to determine bi-directional context interpretation of the Japanese characters of the second set;

outputting a second set of alphabet representations corresponding to the second set of Japanese characters, wherein the second set is determined to be associated with a second Japanese syllabary different from the first Japanese syllabary;

comparing a first set of alphabet representations and the second set of alphabet representations, wherein the first set of alphabet representations are output for the first set of Japanese characters based on processing by the neural network; and based on the comparing, determining that one or more Japanese characters of the first set has the same meaning as one or more different Japanese characters from the second set based on the first Japanese character being equivalent to the different Japanese character.

9. A non-transitory computer-readable storage medium coupled to one or more processors and having instructions stored thereon which, when executed by the one or more processors, cause the one or more processors to perform operations for contextual interpretation of a Japanese word, the operations comprising:

receiving a first set of Japanese characters representing Japanese words within a first document, the first set of Japanese characters being provided only in katakana;

inputting the first set of Japanese characters to a neural network trained to process Japanese characters based on bi-directional context interpretation;

processing the first set of Japanese characters by the neural network through a plurality of learning layers that process the first set of Japanese characters, the neural network comprising a first layer comprising a first set of first long-short term memory (LSTM) cells to process the first set of Japanese characters in an order, each first LSTM cell receiving a Japanese character as input and providing a first interpretation of the respective Japanese character based on the order, and a second layer comprising a second set of second LSTM cells to process the first set of Japanese characters in a reverse order, each second LSTM cell receiving a Japanese character as input and providing a second interpretation of the respective Japanese character based on the reverse order;

outputting, from a third set of third LSTM cells, a first representation of at least one character of the first set of Japanese characters, the first representation comprising a set of Latin-based letters representing a Japanese word, each third LSTM cell receiving a concatenation of a respective first interpretation and a respective second interpretation as input and providing a Latin-based letter based on the order, wherein the first representation corresponds to a meaning of the at least one Japanese character within the first set of characters; and selectively matching the first document to a second document at least partially based on the first representation, the second document comprising a second set of Japanese characters provided in a mix of katakana, hiragana, and kanji, the first document being selectively matched to the second document.

10. The computer-readable storage medium of claim 9, wherein the first set of Japanese characters is provided in a word writing order, and wherein a Japanese character of the first set of Japanese characters is interpreted within the neural network based on context provided by a subsequent Japanese character within the order of the first set and a previous Japanese character of the character within the order of the first set.

11. The computer-readable storage medium of claim 9, wherein the order is an order of the first set of Japanese characters.

12. The computer-readable storage medium of claim 11, further comprising instructions, which when executed causes the one or more processors to perform operations comprising:

determining the first interpretation of the respective Japanese character during processing the received first set of Japanese characters at the neural network based on the bi-directional context interpretation;

determining a Japanese syllabary from a plurality of Japanese syllabaries to be associated with the first set of Japanese characters based on the bi-directional context interpretation of the first set within the neural network; and outputting a Latin alphabet representation of the first interpretation of the at least one character, wherein the first interpretation is associated with a first Japanese syllabary, and the second interpretation is associated with a second Japanese syllabary, wherein the first and second interpretations have a different meaning.

13. The computer-readable storage medium of claim 9, further comprising instructions, which when executed causes the one or more processors to perform operations comprising:

receiving a second set of Japanese characters representing Japanese words in the second document;

inputting the second set of Japanese characters into the neural network to be processed based on the plurality of learning layers to determine bi-directional context interpretation of the characters of the second set;

outputting a second set of alphabet representations corresponding to the second set of Japanese characters, wherein the second set is determined to be associated with a second Japanese syllabary different from a first Japanese syllabary, wherein a first interpretation of the at least one character within the first set of character interpretations is associated with the first Japanese syllabary, and a second interpretation of the at least one character within the second set of character interpretations is associated with a second Japanese syllabary, wherein the first and second interpretations have a different meaning;

comparing a first set of alphabet representations and the second set of alphabet representations, wherein the first set of alphabet representations are output for the first set of Japanese characters based on processing by the neural network; and based on the comparing, determining that one or more characters of the first set has the same meaning as one or more different characters from the second set based on the first character being equivalent to the different character, wherein the at least one character of the first set is in a first Japanese syllabary and is equivalent to one or more different characters from a different Japanese syllabary when an alphabet representation of the character and the different character are the same.

14. A system, comprising:
a computing device; and
a computer-readable storage device coupled to the computing device and having instructions stored thereon which, when executed by the computing device, cause the computing device to perform operations for contextual interpretation of a Japanese word, the operations comprising:
receiving a first set of Japanese characters representing Japanese words within a first document, the first set of Japanese characters being provided only in katakana;
inputting the first set of Japanese characters to a neural network trained to process Japanese characters based on bi-directional context interpretation;
processing the first set of Japanese characters by the neural network through a plurality of learning layers that process the first set of Japanese characters, the neural network comprising a first layer comprising a first set of first long-short term memory (LSTM) cells to process the first set of Japanese characters in an order, each first LSTM cell receiving a Japanese character as input and providing a first interpretation of the respective Japanese character based on the order, and a second layer comprising a second set of second LSTM cells to process the first set of Japanese characters in a reverse order, each second LSTM cell receiving a Japanese character as input and providing a second interpretation of the respective Japanese character based on the reverse order;
outputting, from a third set of third LSTM cells, a first representation of at least one character of the first set of Japanese characters, the first representation comprising a set of Latin-based letters representing a Japanese word, each third LSTM cell receiving a concatenation of a respective first interpretation and a respective second interpretation as input and providing a Latin-based letter based on the order, wherein the first representation corresponds to a meaning of the at least one Japanese character within the first set of characters; and
selectively matching the first document to a second document at least partially based on the first representation, the second document comprising a second set of Japanese characters provided in a mix of katakana, hiragana, and kanji, the first document being selectively matched to the second document.

15. The system of claim 14, wherein the first set of Japanese characters is provided in a word writing order, and wherein a character of the first set of Japanese characters is interpreted within the neural network based on context provided by a subsequent character within the order of the first set and a previous character of the character within the order of the first set.

16. The system of claim 14, wherein the order is an order of the first set of Japanese characters.

17. The system of claim 16, wherein the computer-readable storage device includes further instructions, which when executed by the computing device cause the computing device to perform operations comprising:
determining the first interpretation of the respective Japanese character during processing the received first set of Japanese characters at the neural network based on the bi-directional context interpretation;
determining a Japanese syllabary from a plurality of Japanese syllabaries to be associated with the first set of Japanese characters based on the bi-directional context interpretation of the first set within the neural network; and
outputting a Latin alphabet representation of the first interpretation of the at least one character, wherein the first interpretation is associated with a first Japanese syllabary, and the second interpretation is associated with a second Japanese syllabary, wherein the first and second interpretations have a different meaning.

18. The system of claim 14, wherein the computer-readable storage device includes further instructions, which when executed by the computing device cause the computing device to perform operations comprising:
receiving a second set of Japanese characters representing Japanese words in the second document;
inputting the second set of Japanese characters into the neural network to be processed based on the plurality of learning layers to determine bi-directional context interpretation of the characters of the second set;
outputting a second set of alphabet representations corresponding to the second set of Japanese characters, wherein the second set is determined to be associated with a second Japanese syllabary different from the first Japanese syllabary;
comparing a first set of alphabet representations and the second set of alphabet representations, wherein the first set of alphabet representations are output for the first set of characters based on processing by the neural network; and
based on the comparing, determining that one or more characters of the first set has the same meaning as one or more different characters from the second set based on the first character being equivalent to the different character.

* * * * *